Feb. 2, 1971  J. E. BUCHANAN  3,560,175
DRILL SPLITTING APPARATUS
Filed Aug. 5, 1968  12 Sheets-Sheet 1

INVENTOR
JOHN E. BUCHANAN
ATTORNEY

Feb. 2, 1971   J. E. BUCHANAN   3,560,175
DRILL SPLITTING APPARATUS
Filed Aug. 5, 1968   12 Sheets-Sheet 2
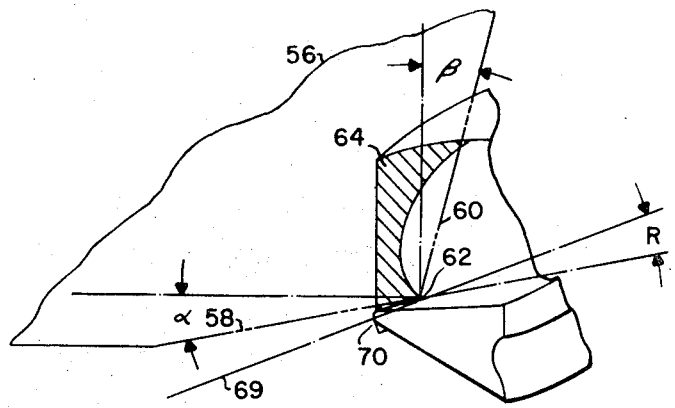
FIG. 4
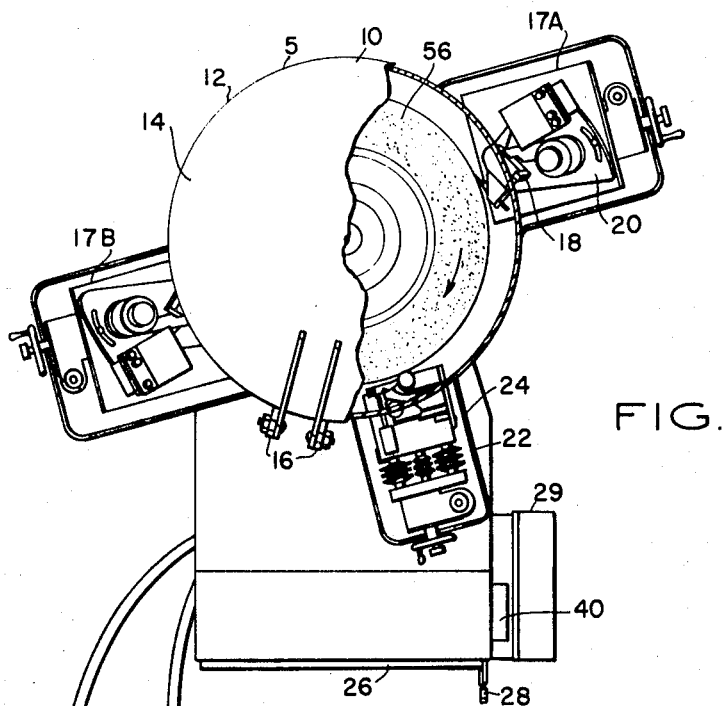
FIG. 2
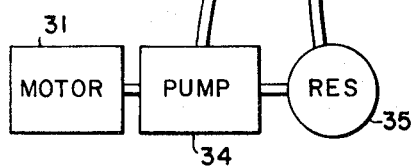
INVENTOR
JOHN E. BUCHANAN
*ATTORNEY*

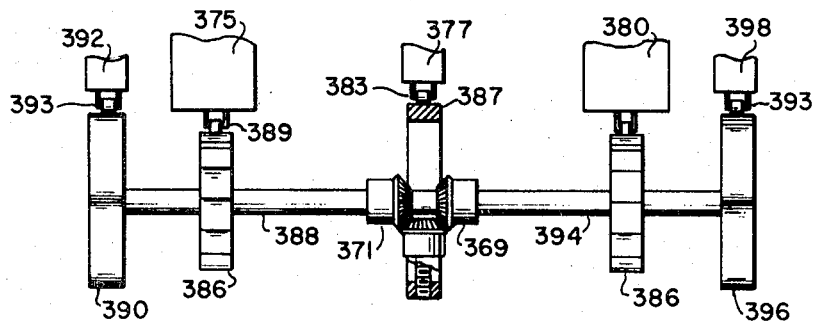
FIG. 24
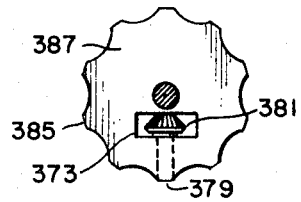
FIG. 26
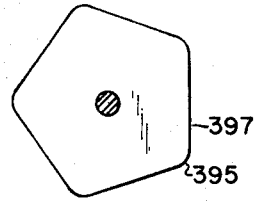
FIG. 27
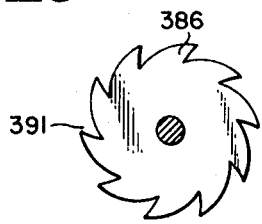
FIG. 25
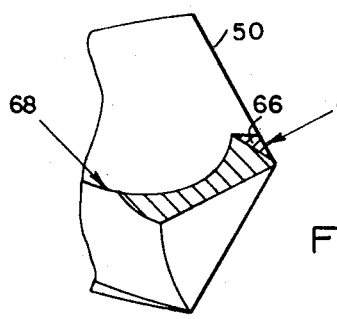
FIG. 3C
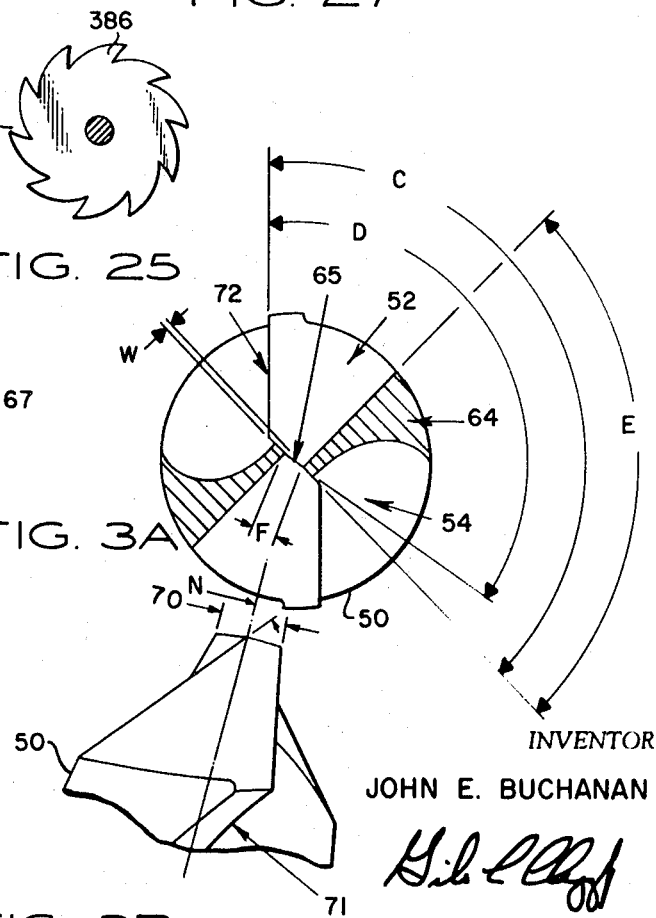
FIG. 3A
FIG. 3B
INVENTOR
JOHN E. BUCHANAN
ATTORNEY Feb. 2, 1971  J. E. BUCHANAN  3,560,175
DRILL SPLITTING APPARATUS
Filed Aug. 5, 1968  12 Sheets-Sheet 4
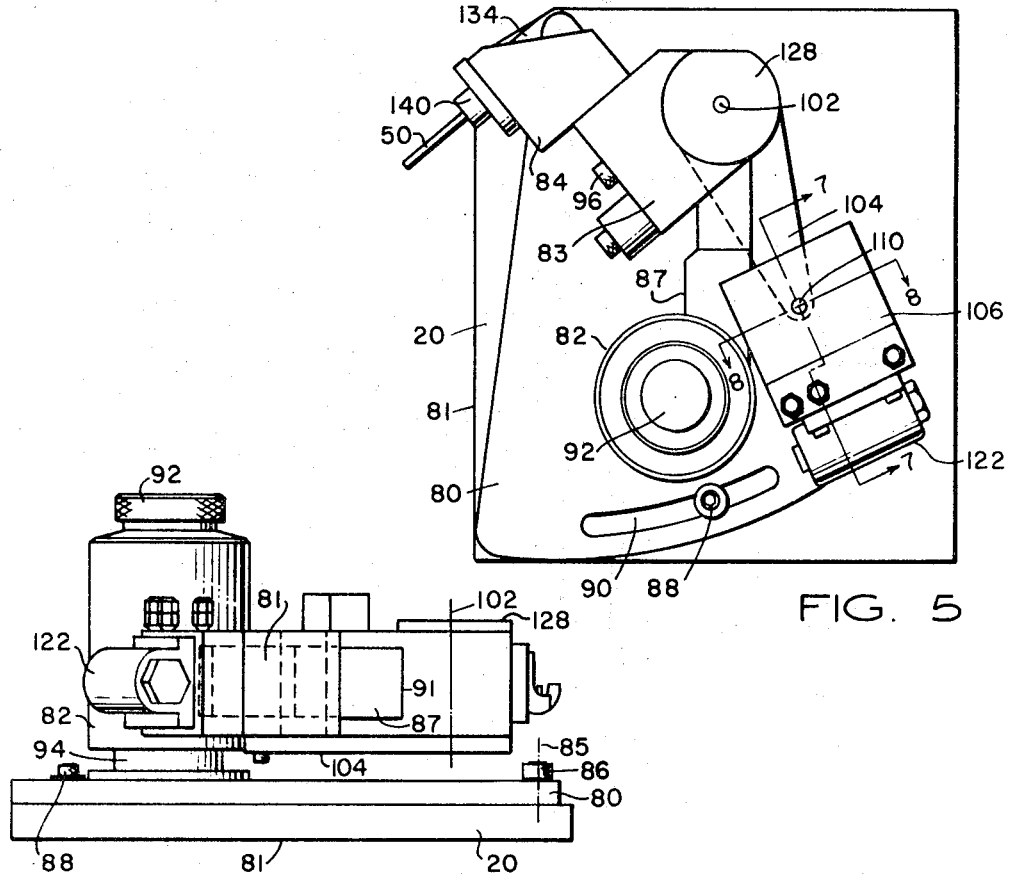
FIG. 5
FIG. 6
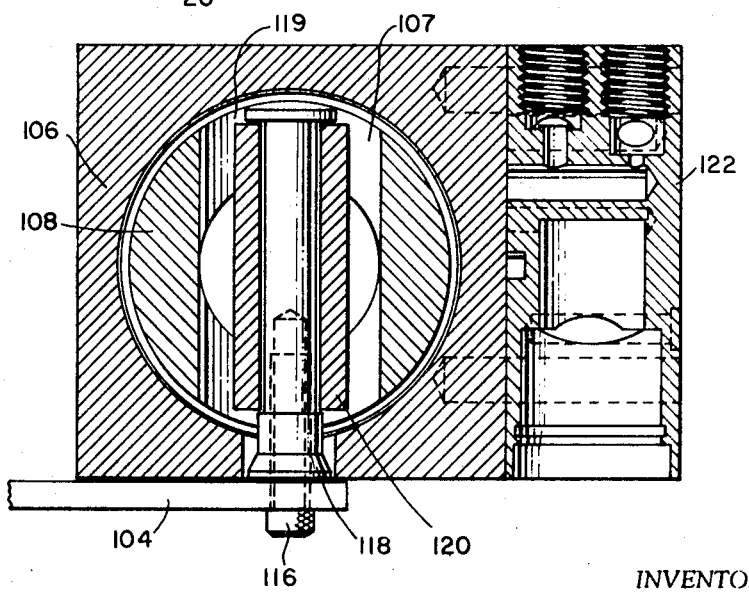
FIG. 7
INVENTOR
JOHN E. BUCHANAN
ATTORNEY Feb. 2, 1971  J. E. BUCHANAN  3,560,175
DRILL SPLITTING APPARATUS
Filed Aug. 5, 1968  12 Sheets-Sheet 5

INVENTOR
JOHN E. BUCHANAN

ATTORNEY

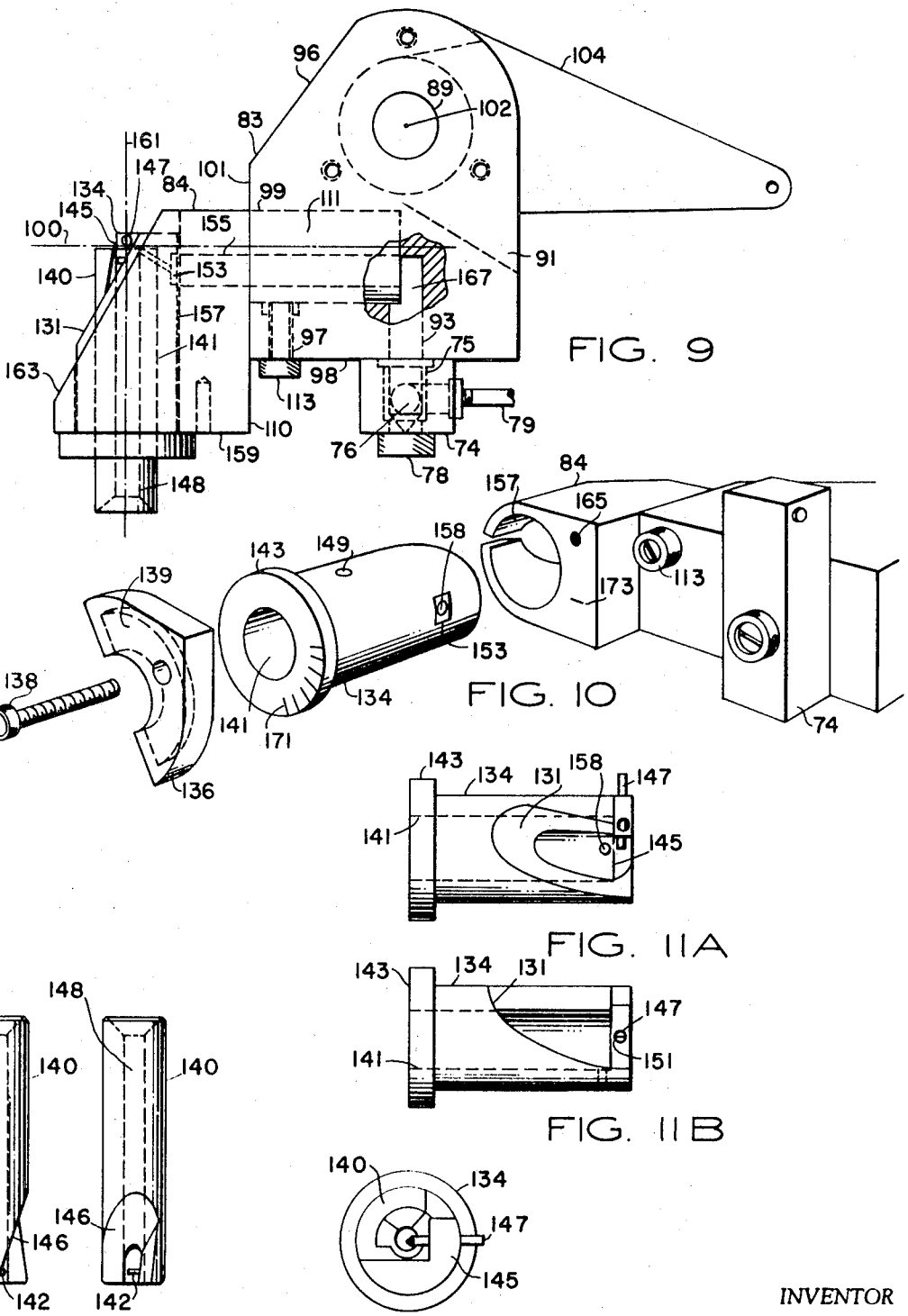

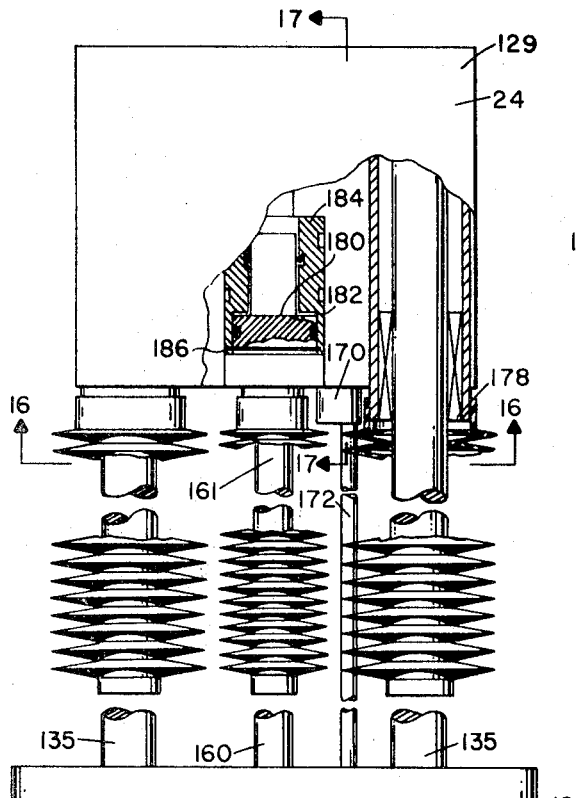
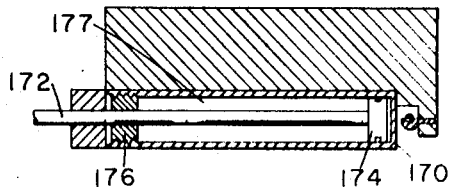
FIG. 17
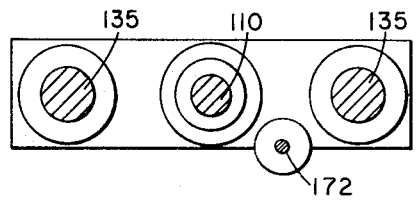
FIG. 16
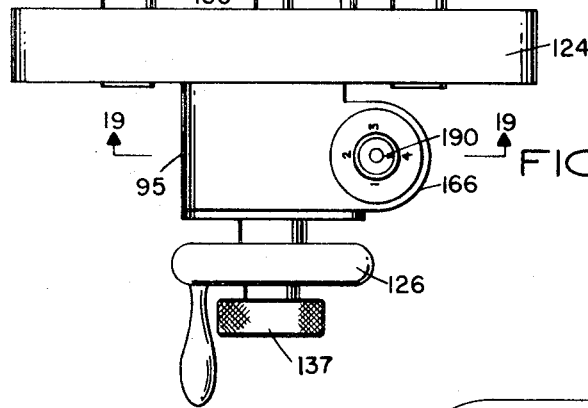
FIG. 14
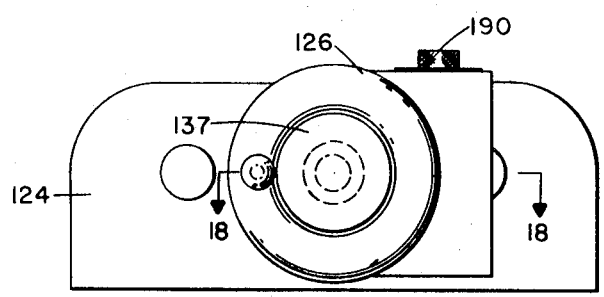
FIG. 15
INVENTOR
JOHN E. BUCHANAN
ATTORNEY

INVENTOR
JOHN E. BUCHANAN
ATTORNEY

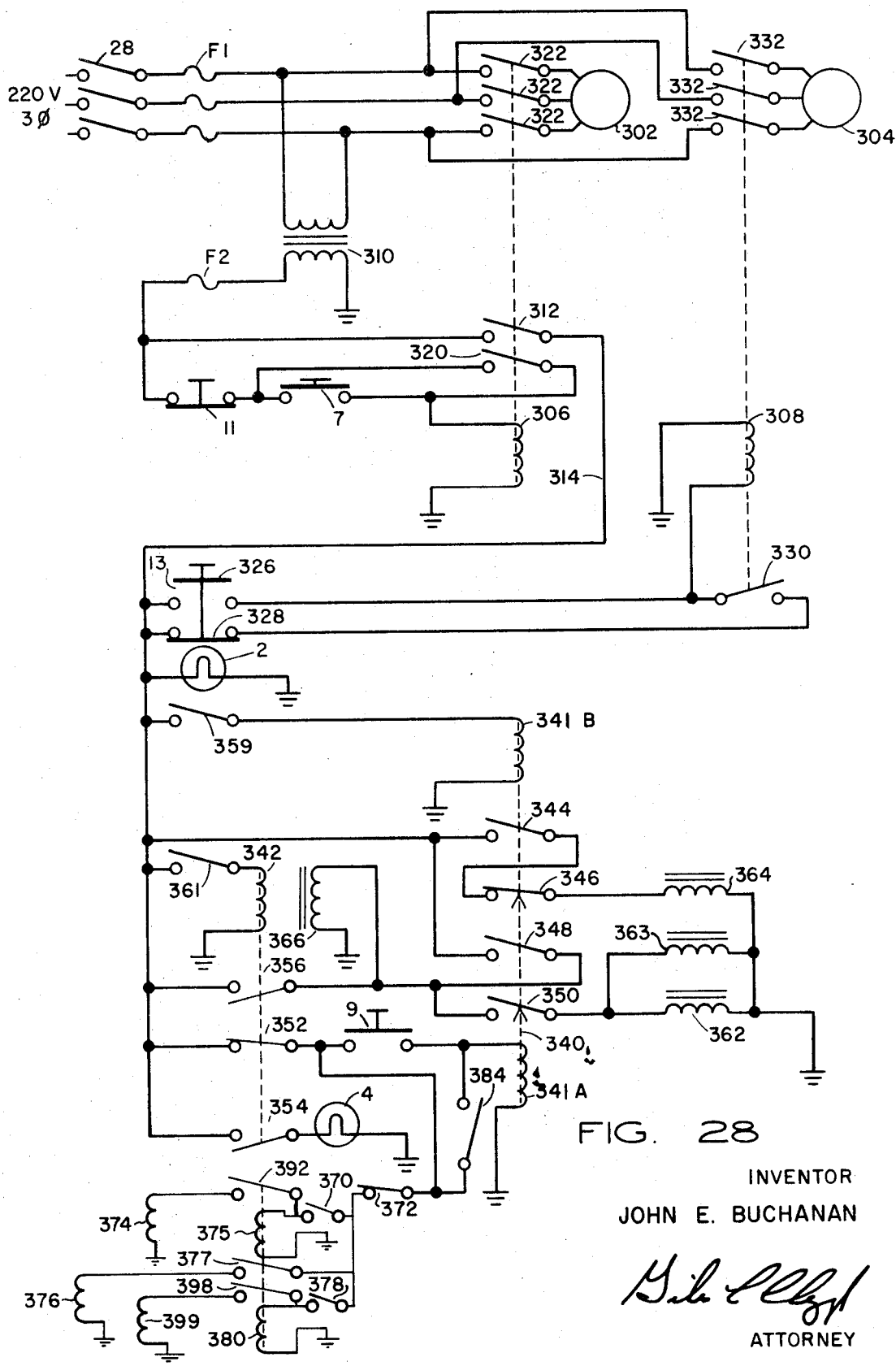

INVENTOR
JOHN E. BUCHANAN

ATTORNEY

INVENTOR
JOHN E. BUCHANAN

ATTORNEY

United States Patent Office 3,560,175
Patented Feb. 2, 1971

3,560,175
DRILL SPLITTING APPARATUS
John E. Buchanan, Arlington, Tex., assignor to Precision Drill Pointing Incorporated, Arlington, Tex., a corporation of Texas
Filed Aug. 5, 1968, Ser. No. 750,210
Int. Cl. B24b 19/00
U.S. Cl. 51—96                    15 Claims

ABSTRACT OF THE DISCLOSURE

There is disclosed a drill splitting apparatus having a plurality of work stations. The apparatus includes means for positioning the drill adjacent to the grinding wheel to grind a split or notch on the drill at the desired angle. There is also disclosed means for automatically dressing the grinding wheel when predetermined numbers of drills have been split and for automatically advancing the work stations to compensate for material dressed from the grinding wheel.

---

The extensive use of either very soft or very hard metals in recent years has resulted in substantial advances in the technology of working such materials. One of the areas in which technology has advanced relates to the type of point required on a drill used for boring holes in the metal. Thus, it is known that a drill which will work successfully in one type of material will be much less effective in another type of material. As the result of the advances in technology, it has become known to notch or split drill tips to provide secondary cutting surfaces and reduce the size of the chisel point of the drill. It is generally known that a properly split drill will cut materials which would not be cut by a drill of the same type which has not been split and also has substantially greater life before re-tipping is required.

Although notching or splitting of drills has been known for some time, the operation generally has remained one performed manually by skilled personnel. The operation is critical and normally performed with the operator observing his work through a magnifying glass. Although some machines have been designed for splitting drills, they have not been altogether successful due to their lack of reliability in splitting drill points with the required degree of preciseness and their uneconomical modes of operation.

The present invention provides an improved machine for splitting drill points which has been found to be extremely reliable and to produce consistently good points on drills.

In accordance with the principles of the present invention, there is provided a machine comprising a grinding wheel of conventional type. There is also provided means for automatically dressing the grinding wheel to provide desired grinding surfaces for producing the desired notches in the drill points. The machine includes one or more work stations in addition to a dresser station for dressing the grinding wheels. Each of the work stations includes a drill holder mounted on a carriage. The drill holder is adjustable to support a drill at different desired angles relative to the grinding surfaces of the grinding wheel. Moreover, the drill holder is especially designed such that all movements are about the point of the drill, such that changing one or more angles does not require extensive set-up. The machine includes means for counting the number of drills ground by each work station and the total number of drills pointed in any cycle such that the grinding wheel can be dressed when the predetermined number of drills have been pointed to maintain the character of the grinding wheel. The machine further includes a means for automatically advancing the carriages associated with the work station and the dresser to maintain the desired relationship between the work stations and the grinding wheel.

Many objects and advantages of the invention will become apparent to those skilled in the art as the following detailed description of a preferred embodiment of the invention unfolds in conjunction with the appended drawings wherein like reference numerals denote like parts and in which:

FIG. 2 is a plan view of the machine shown in FIG. 1;

FIGS. 3A through 3C are views of a drill tip showing the various areas from which material is removed in the course of a splitting operation;

FIG. 4 is a view showing the relationship between grinding wheel and drill tip during the notching or splitting operation;

FIG. 5 is a plan view of tool holder in accordance with the preferred embodiment of the present invention;

FIG. 6 is a side elevational view of the tool holder in FIG. 5;

FIG. 7 is a view taken along line 7—7 of FIG. 5;

FIG. 9 is a plan view of a drill supporting head used in the preferred embodiment of the present invention;

FIG. 10 is an expanded view of a portion of the head shown in FIG. 9;

FIGS. 11A and 11B are side elevation views of a bushing holder used in holding and positioning a drill in accordance with the present invention;

FIG. 11C is a front elevation view showing a drill bushing positioned in the bushing holder;

FIGS. 12A and 12B are side elevation views of a drill bushing which is supported within the bushing holder of FIGS. 11A and 11B;

FIG. 14 is a plan view of a carriage used in the present invention with the portions of carriage broken away to reveal interior parts;

FIG. 15 is a front elevation view of the carriage shown in FIG. 14;

FIG. 16 is a view taken along the line 16—16 of FIG. 14;

FIG. 17 is a view taken along line 17—17 of FIG. 14;

FIG. 24 is a front elevation view of a portion of the drive mechanism of the counter integrator provided by the present invention;

FIG. 25 is a side elevation view of the rachet wheel used in the counter of FIG. 24;

FIG. 26 is a side elevation view of a cam used in the counter integrator of FIG. 24;

FIG. 27 is a side elevation view of another cam;

Figure 29A:
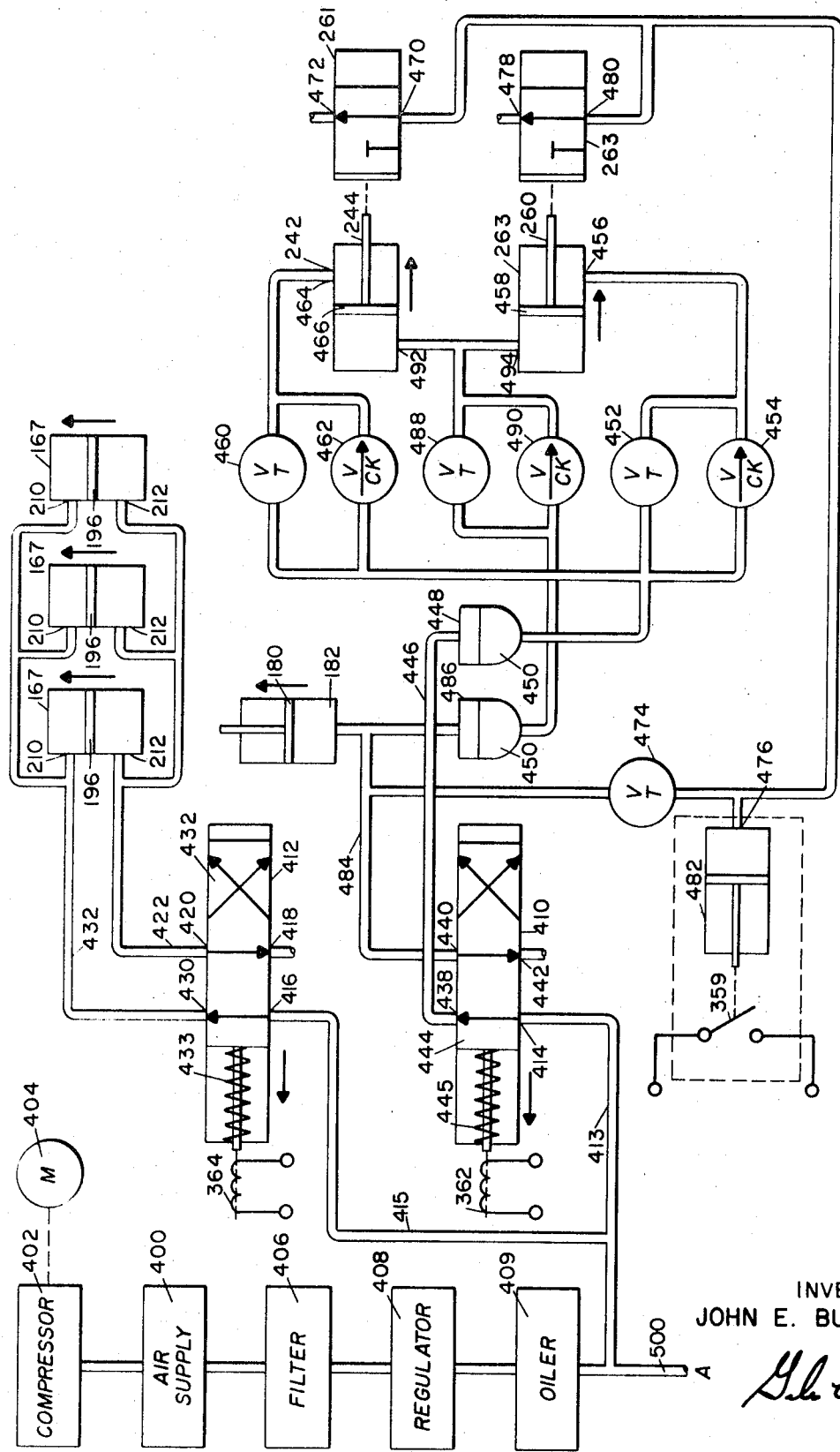
Figure 29B:
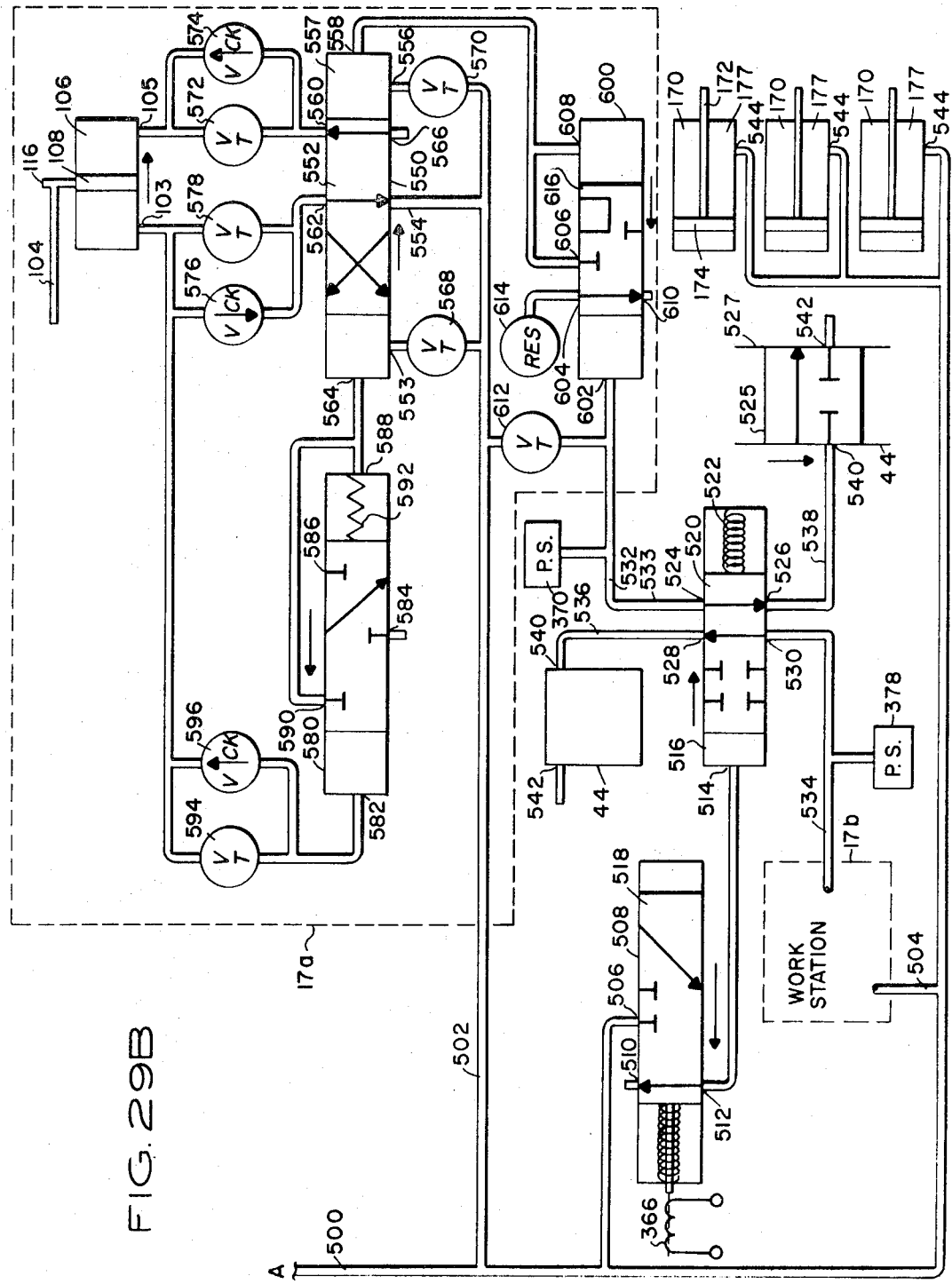

FIG. 28 schematically illustrates the electrical control circuitry associated with preferred embodiment of present invention; and FIGS. 29A and 29B are schematic illustrations of the pneumatic and hydraulic control system associated with the preferred embodiment of the present machine.

Figure 1:
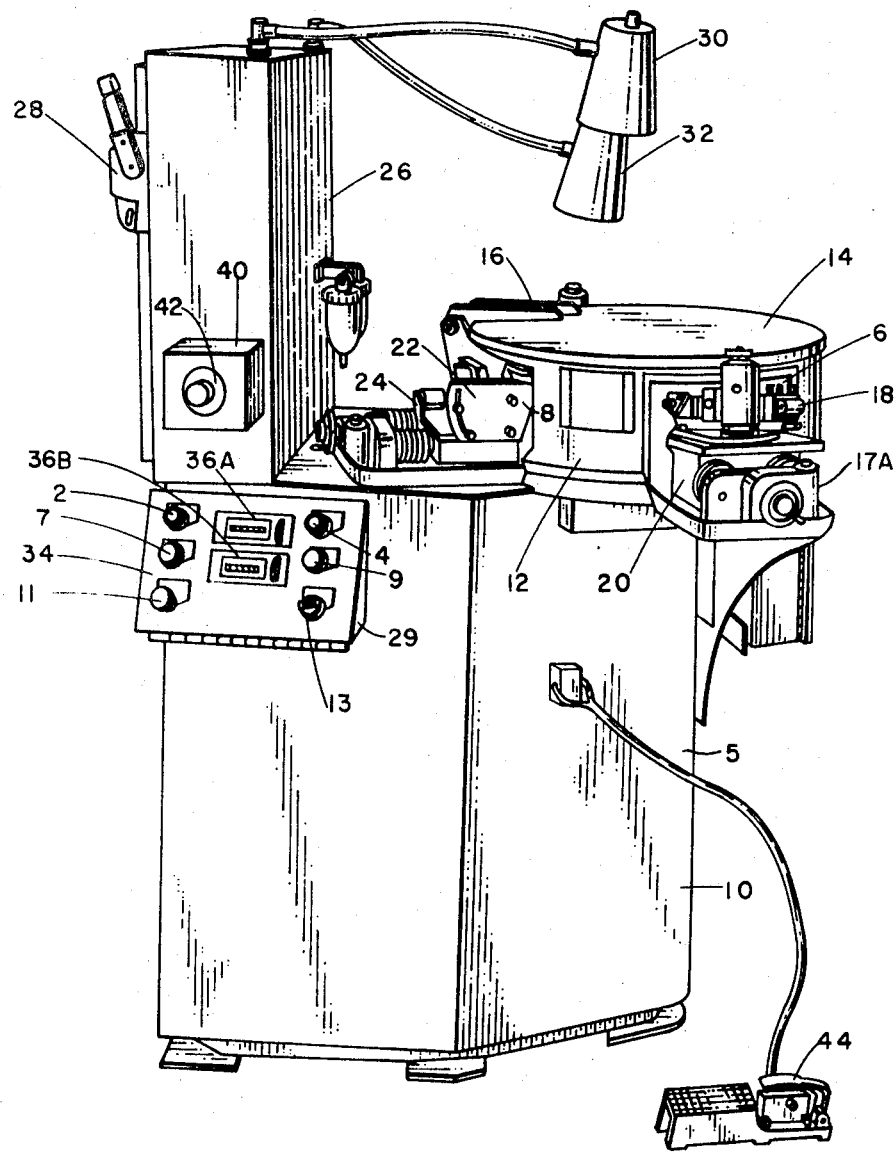
FIG. 1 is a perspective view illustrating a machine in accordance with the preferred embodiment of the present invention.

A drill splitter in accordance with a preferred embodiment of the invention is shown in FIGS. 1 and 2 of the drawings and designated generally by the reference numeral 5. The machine comprises an enclosed housing 10 which is adapted to be supported on a surface. Mounted on the upper side of the housing pen is a grinding wheel enclosure 12 having ports 6 through which drills to be notched pass into engagement with a grinding wheel 56 positioned within the enclosure. There is also provided an opening 8 through which a dressing mechanism 22 passes to engage the grinding wheel. A coverplate 14 covers the grinding wheel and is connected to the grinding wheel enclosure 12 by hinges 16. Mounted on the side of the housing adjacent to the grinding wheel is a pair of work stations 17A and 17B, only station 17A being shown in FIG. 1. Each work station comprises a tool holder 18 which is carried by a carriage 20. Also mounted adjacent to the grinding wheel is a grinding wheel dressing mechanism 22 which is carried on a carriage 24 similar to the carriage 20 for the tool holder.

A control enclosure 26 carried on the back of the housing 10 behind the grinding wheel enclosure contains most of the electrical control circuitry of the machine. Master switch 28 is shown on the back of the control enclosure 26 and individual working lights 30 and 32 protrude forwardly therefrom on flexible extensions. Other supporting controls for the machine include a control panel 29 mounted on the face of the housing for easy access. Also positioned on panel 29 are counters 36A and 36B which record the total number of drills split by each of the work stations 17A and 17B respectively.

The control panel includes lamps 2 and 4 which are colored red and green, respectively. When lamp 2 is energized, it indicates that power is applied to the motor which drives the grinding wheel. When red lamp 4 is energized, it indicates that the grinding wheel is consumed. A switch 7 applies power to the system, a manual switch 9 causes the grinding wheel to be dressed when operated, switch 11 is a stop switch and switch 13 controls the coolant motor.

A dresser counter 40 is also mounted on the side of the control enclosure. The dresser counter records the number of drills split by the two work stations between wheel dressings. The counter 40 is the type that when a total count established by the knob 42 is attained by the dresser counter, a signal is provided to the control circuitry to cause the work stations to be de-activated and the wheel dressing mechanism to be operated for dressing the faces of the grinding wheel. Upon dressing of the wheel, the dresser counter is automatically reset to zero. Each work station includes a separate foot pedal 44 for operating the individual work stations. Operation of the foot pedal 44 causes operation of the counters 36A, 36B and 40.

There is also provided a motor 31 which drives a pump 34 for supplying coolant fluid to the work stations 17A and 17B from a reservoir 35. Necessary piping for interconnecting the pump, the work stations, the foot pedals, and other parts is provided, but not shown as to do so would unnecessarily complicate the drawing.

Turning now to FIGS. 3A and 3C, there is shown a drill with portions ground away in the course of splitting the drill shaded. Thus, the drill is denoted generally by the reference character 50 and includes a pair of lands 52 and a pair of flutes 54. Each of the lands includes a leading edge 71 and a trailing edge 68. In the course of splitting the drill, the grinding wheel is brought into contact with the drill to remove the material from split area 64. The amount of material removed is such that an angle N is formed between the plane of area 64 and the axis 69 of the drill, as shown in FIG. 3B. A smaller amount of material is also removed from the area 66 on the leading edge of each land of the drill to provide a secondary cutting edge 67. The area 66 inclines relative to the axis of the drill at angle R, as better illustrated in FIG. 4.

A third important angle to be considered is the chisel angle, shown in FIG. 3A as angle C. The chisel angle is an angle formed between the cutting edge 72 and the secondary cutting edge 67. A fourth angle of importance is the angle D between the cutting edge 72 and the chisel edge 65 formed across the web 70 between the flutes.

The grinding wheel, designated by reference character 56 is shaped as shown in phantom in FIG. 4 of the drawings. FIG. 4 of the drawing is a view taken normal to the plane of area 64 with a cut away portion of the grinding wheel 56 illustrated. It can be seen that the wheel 56 includes an under surface 58, grinding face 60 and a grinding edge 62. Surface 58 is inclined relative to a horizontal plane at angle $\alpha$ and surface 60 is inclined to a vertical plane at angle $\beta$. The drill is moved into contact with the grinding wheel with the web 70 of the drill moving in a plane parallel to and slightly under the plane of the under side 58 with the axis 69 of the drill inclined vertically by the rake angle R. The width W will be twice the spacing between the plane in which the point moves and the plane of surface 58. The diameter of the grinding wheel 56 is sufficiently large with respect to the diameter of the drill 50 that the edge of the grinding wheel is essentially a straight line and the axis 69 of the drill is inclined horizontally with respect to the grinding edge 60 at the notch angle N. The chisel angle C is controlled by rotation of the drill about its axis. Angle E is a function of the shape of the grinding wheel and is equal to $90°$ plus $\beta$. Width F is the width of the web F after notching. From the foregoing, it can be seen that the character of the grinding wheel is very important.

The tool holder 18 is shown in greater detail in FIGS. 5 through 12 of the drawings. One of the features of the present invention is the tool holder which provides for individual adjustment of the rake angle R, a notch angle N, the chisel angle C and the widths F and W without disturbing the relationship between the drill to be pointed and the grinding wheel so as to effect other angles or planes. Thus, as shown in FIGS. 5 through 12, the tool holder comprises a base plate 80 adapted for mounting on plate 81 of the carriage 20, a head support 82, a head 83 and a collar 84. The base plate 80 is supported on plate 81 of the tool holder carriage 20 for movement about the axis 85 of pin 86. The degree of pivotal movement is restricted by a bolt 88 which passes through an arcuate slot 90 in the base plate 80 and threadably engages the plate 81 of tool holder 20. The slot 90 is elongated and conforms to an arc about the axis 85 so that when bolt 88 is loose, the tool holder is capable of pivotable movement about the vertical axis 85 limiting by the length of the slot 90. Pivotal movement of the tool holder about the vertical axis 85 of pin 86 provides adjustment of the angle of engagement with the drill with the grinding wheel and thereby permits adjustment of the notch angle cut into the drill during the grinding operation. It is important to note that the axis of pin 86 intersects the tip 70 of a drill 50 held in the tool holder. Thus, pivotal movement of the drill holder about the axis of pin 86 does not disturb the position of the tip 70 of the drill relative to the grinding wheel 56.

Figure 13:
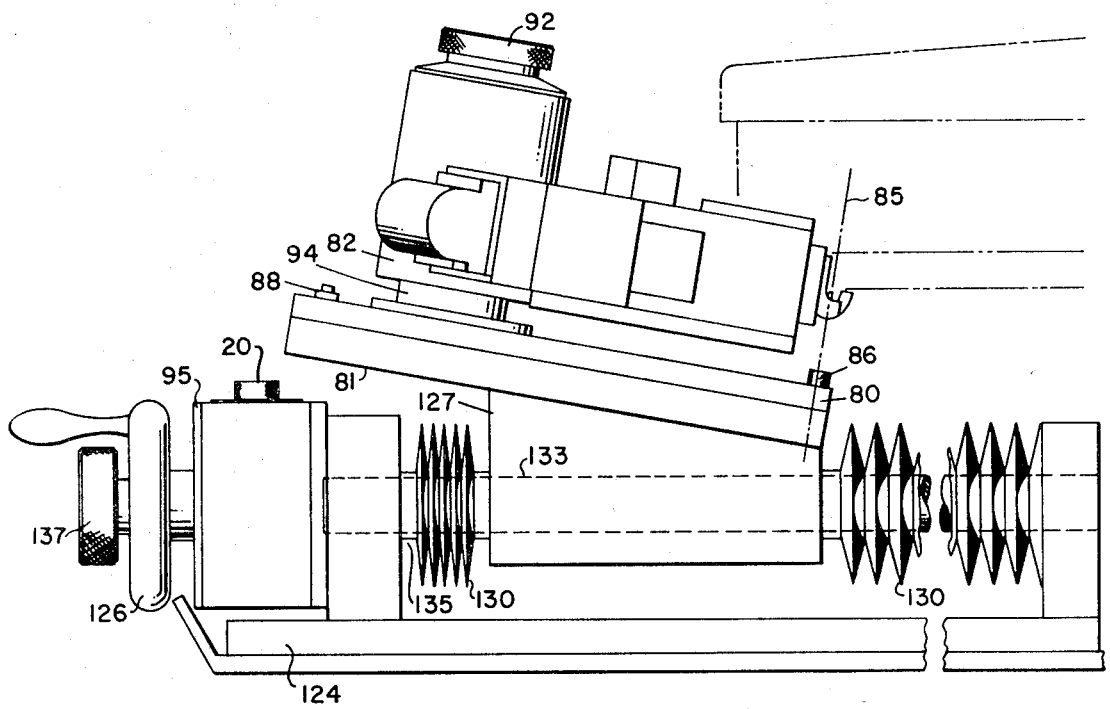
FIG. 13 is a side elevation view of a portion of work station illustrating the manner in which a tool holder is mounted on the carriage.
Figure 18:
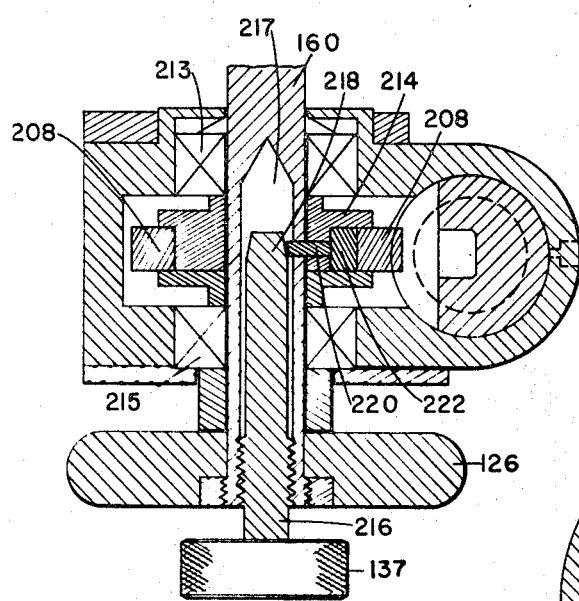
FIG. 18 is a view taken along line 18—18 of FIG. 15.

As best seen in FIG. 6, the head support 82 is supported on base plate 80 by leg 94. The leg 94 is the mounting for head support 82 permitting the height of the head support to be adjusted by a threaded shaft means connected to a thumbwheel 92 and which is rotatably mounted in a cavity formed vertically through a central portion of the head support. The head support can thus be raised or lowered in relation to the grinding wheel by turning the thumbwheel 92. The plate 80 is positioned on the carriage 20 in a plane which is parallel to the plane of the under surface 58 of the grinding wheel 56 as shown in FIG. 13, such that operation of the thumbwheel 92 controls the position of the plane in which the tip of the drill moves relative to the plane of the under surface of the grinding wheel controlling the width W of the drill being split. As mentioned previously, it is desired that the plane in which the tip of the drill moves be slightly below the plane of the surface 58 by a distance equal to one half W when the drill engages the grinding wheel.

Figure 8:
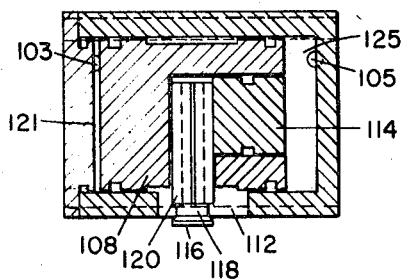
FIG. 8 is a view taken along line 8—8 of FIG. 5.

The head 83 is pivotably connected to arm 87 of the head support 82 for reciprocal movement about an axis 102. Thus, an actuating arm 104 connects the head 83 to a piston 108 which moves in a member 106 with the member 106 fixed to arm 87. Thus, as best shown in FIGS. 7 and 8, a cylindrical bore 107 is defined in member 106. The arm 104 is connected to the piston 108 by a screw 116 which passes through the end of the actuating arm 104 and engages a drive pin 118. The drive pin 118 passes through slot 112 which communicates with bore 107 and engages a split shoe 120 which rides in an internal bore 119 through a central part of piston 108.

Referring now to FIG. 8, it can be seen that the piston 108 defines a cylindrical receptacle 115 which receives a second smaller piston 114. Pneumatic pressure is admitted through apertures 103 and 105 into chambers 121 and 125 of cylinder 106 to control movement of piston 108. Some pressure is always maintained in chamber 125 driving piston 114 against shoe 120 to maintain a load on it and minimize the effect of any wearing of the bearing surface. Movement of piston 108 in member 106 is coupled to head 83 causing the head 83 to pivot about axis 102, moving the drill 50 into and out of position against the grinding wheel 56. It will be noted that axis 102 is normal to the plane of surface 58, such that the point 70 of the drill will move in a plane parallel to surface 58.

The head 83 is shown in greater detail in FIG. 9 of the drawings. Thus, the head 83 includes a body member 96 having a bore 89 which extends therethrough for receiving bearings (not shown). Cover plate 128 and the arm 104 serve as end closures for the bearings. A portion of the side of the member 96 is cut away at 91 to form a slot for receiving the arm 81 with the arm 81 being connected to the bearing such that the head 83 will pivot about the axis 102 of bearings positioned within the hole.

Also provided in the head 83 is a second bore 99 formed in surface 101 with the axis 100 thereof intersecting axis 86, a threaded hole 97 which communicates with bore 99 from the surface 98 and a third bore 93 which communicates with the bore 99, also from the surface 98. Valve member 74 is connected to the side 98 of head 83 with passageway 75 communicating with passage 93. A valve arrangement 76, suitably a gate valve, is provided for controlling the flow of fluid from tubing 79 to passage 93 with the amount of flow adjusted by knob 78.

The collar 84 includes a main body portion 110 and a shaft 111 which is received within bore 99 of the body member 96. The body portion 110 is provided with a bore 157 which extends from surface 159 through the body portion 110. The axis 161 of bore 157 intersects axis 86 and axis 100. The collar 84 is cut diagonally along surface 163 in order to expose the end of a drill bushing 140 and the drill bushing holder 134. A threaded hole 165 also extends into the body portion 110 from the surface 159.

The collar 84 is assembled to the head 83 by inserting shaft 111 into the bore 99. It will be noted that the shaft 111 does not extend to the bottom of the bore 99 providing a cavity 167. Passageway 93 extends from surface 98 and communicates with the cavity 167. Cap screw 113 received in hole 97 operates a lock (not shown) for maintaining the position of collar 84 relative to head 83.

The bushing holder 134 fits into the collar 84 as shown in FIG. 10 and is held in place by lock 136. It will be noted that the lock 136 is provided with a groove 139 which conforms to the head 143 of the bushing for locking the bushing holder in place when the cap screw 138, which fits in the threaded hole 165, is tightened. Indicia 171 and 173 can be provided on head 143 and collar 84 to aid in positioning the bushing holder in the collar.

The drill bushing 140 is positioned within the bushing holder 134 as shown in FIGS. 9 and 11C. It will be noted that the position of the bushing relative to the bushing holder is fixed by a set screw 149. It will also be noted that the bore 141 in the bushing holder 134 does not extend all the way through but stops short at end 145. A portion of the wall of the bushing holder is machined away at 131 to permit access by the grinding wheel to a drill held by bushing 140. The bushing holder 134 is also provided with a stop member 147 whose knife edge 151 is aligned with the axis 161 of the bushing holder such that a drill positioned within the bushing will rest against the corner of edge 151. It will be noted that knife edge 151 is positioned along the axis 85 of pin 86 and similarly that the axis 100 of shaft 111 intersects the knife edge 151. Thus, the axis of either the pin 86 or the shaft 111 or the bushing holder 134 all intersect at a point on the knife edge 151 which the drill would touch when positioned in the drill bushing 140.

The drill bushing 140 is shown in greatest detail in FIGS. 12A and 12B. Thus, the drill bushing is a tubular member having a bore 148 formed therein for receiving the drill, the diameter of the bore 148 being chosen to receive a drill with slight clearance in order that the drill will be firmly positioned. As with the bushing holder 134, a portion of the drill bushing is machined away at 146 to permit access of the grinding wheel to a drill to be split. A pin 142 extends into the bore 148. When a drill is inserted into the drill bushing with the bushing positioned in the bushing holder, it is inserted until the tip of the drill rests against the chisel edge 151 and then the drill is twisted until a leading edge of one of the flutes bears against pin 142. The drill will then be properly positioned relative to the grinding wheel to receive the desired splitting.

It is necessary during the grinding operation that a coolant be applied to the grinding surface to prevent undue heating of the drill. One of the features of the present invention is that rather than provide a pipette which oftentimes cannot direct the coolant fluid to the proper location and which is subject to being damaged by the grinding wheel or pushed to the improper position, the coolant flows through the bushing holder 134 directly on the point of the drill at which the coolant is required. Thus, the collar 134 is provided with a small passageway 158 which opens from the passageway 155 formed in shaft 111 to a point in the collar adjacent the tip of the drill. The flow of fluid is through a line 79 and a valve member 74 having the passageway 75 which communicates with passageway 93. It will be noted that the passageway 155 is not axially with shaft 99, but the provision of the cavity 167 renders such alignment unnecessary. Further, bushing holder 134 is similarly provided with a small reservoir 153 at the opposite end of passageway 155 such that even though the bushing holder may be rotated in the collar 84, a portion of the reservoir 153 will communicate with passageway 155.

Figure 20:
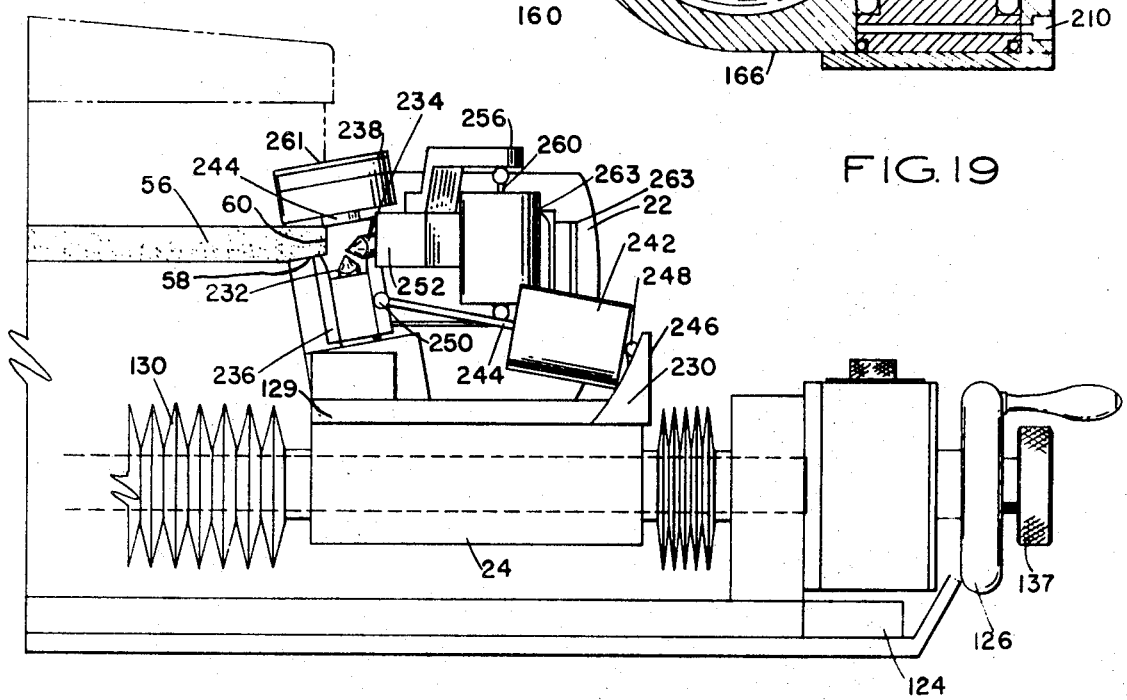
FIG. 20 is a side elevation view showing the manner in which the dressing mechanism is mounted on a carriage.
Figure 21:
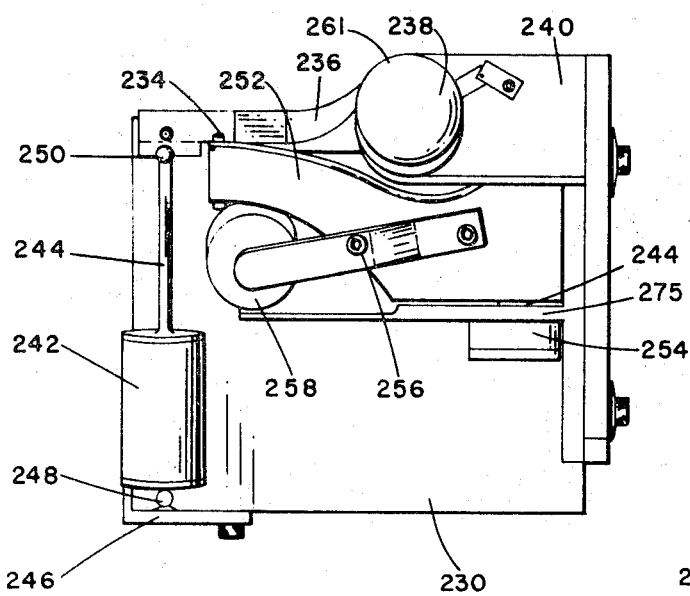
FIG. 21 is a plan view of the dressing mechanism in accordance with the present invention.
Figure 22:
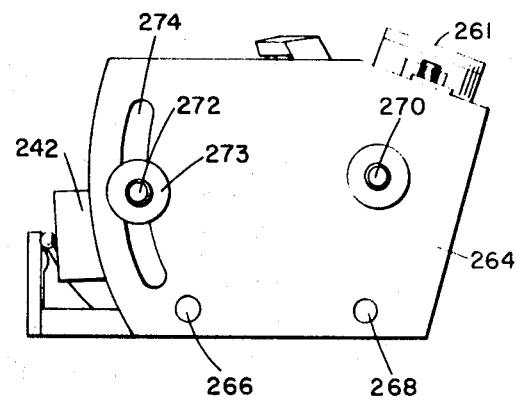
FIG. 22 is a side elevation view of the dressing mechanism shown in FIG. 21.
Figure 23:
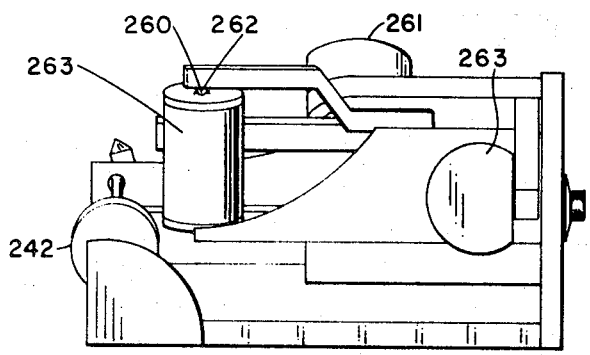
FIG. 23 is a front elevation view of the dressing mechanism shown in FIG. 21.

The carriages 20 and 24 are shown in FIGS. 13 and 20 respectively and can readily be seen to be quite similar. Associated with each carriage is a feed assembly designated generally by reference character 95. The carriage 20 includes a supporting block 127 and carriage 24 includes a supporting block 129, each of which includes bores 133 for receiving two shafts 135 on which the block moves and a lead screw 160 for positioning the blocks. Bellows 130 enclose the shafts 135 to protect the shaft from abrasive dust and other foreign material, insuring that the blocks move freely on the shafts. The upper surface of block 127 is inclined at the angle α and plate 81 is attached thereto. Thus, as described previously, the plane of the arc in which the drill tip moves will be parallel to the plane of surface 58 of the grinding wheel. The supporting block 129 is similar to block 127 in all respects except its upper surface is flat and in a plane parallel to the shafts 135 and normal to the axis of the grinding wheel 56.

FIGS. 14 through 19 show the feed assembly 95 on which the tool holder carriage and wheel dresser carriage are mounted in greater detail. The feed assemblies for the tool holder carriages and the dressing carriage are identical with on exception which will be explained. Shafts 135 which are attached to the lead screw support 124 at the outer ends form a saddle on which the carriages move. Each of the supporting blocks 127 and 129 are provided with annular bearings 178 through which the shafts pass. The lead screw 160 includes threads 161 along the terminal portion of its length. A lead screw nut 180 carried by the supporting block threadably engages the threaded portion of the lead screw 160.

In the supporting block 127, the lead screw nut 180 is fixably attached to the block whereby rotation of the lead screw causes the carriage to move either forward or backward along the lead screw riding on the shafts 135. Thus, turning the lead screw moves the carriage carried thereon either toward or away from the grinding wheel. In the block 129 the lead screw nut fits within a cylinder 184 defined integrally within the block and acts as a piston therein.

The length of the cylinder 184 is slightly longer than that of the nut whereby the nut is allowed a certain amount of movement therein suitably in the order of 0.040 inch. Air introduced into the area 182 between a lip formed in the cylinder 184 and the nut 180 causes the carriage to move forward toward the grinding wheel a distance equal to the clearance 186 between the nut and snap ring.

A second cylinder 170 is provided to bias the carriage away from the grinding wheel. The cylinder 170 includes a piston 174 and a piston rod 172, which is connected on its outer end to the lead screw support 124. The cylinder 170 is fixedly attached to the carriage whereby air introduced into the interior chamber 177 of the cylinder causes the carriage to pull outwardly on the lead screw closing the area 182.

The lead screw support 124 also includes a housing 166 which defines a cylinder 167 in which moves a piston 196. Piston 196 includes a pawl 198 pivotally attached at 200 thereto. Spring means 202 bias the end 204 of the pawl into engagement with teeth 206 on rachet wheel 208. A selector 190 is provided on top of the housing and is connected to a stop 192 by shaft 194. The piston 196 includes recesses 195 of various depths in its upper end. The recesses vary in depth corresponding to the distance between the teeth 206 on the rachet wheel 208. Thus, the placement of the stop 192 over one of the various recesses 195 retards the travel of the piston 196 according to the depth of the recess whereby the pawl 198 can be caused to selectively engage either one or more teeth of the rachet wheel upon each stroke of the piston. The housing 166 includes an opening 210 at the lower end of the piston and an opening 212 at the upper end thereof for admitting air to the cylinder chambers at each end of the piston 196. Thus, air admitted through the opening 210 will cause the piston to move up against the stop 192 and depending upon the depth of the recess 195 over which the stop is placed, the pawl 198 will move up on the rachet wheel 208 one or more teeth. Conversely, air admitted into the opening 212 will force the piston downward and turn the rachet wheel by an amount which is a function of the number of teeth moved over by the pawl. When the lead screw is in the operating position, to be described in reference to FIG. 19, rotational movement of the rachet wheel 208 causes a like rotational movement of the lead screw 160 to move the carriage the thereon. A spring loaded pawl (not shown) is provided for preventing counter clockwise rotation, as viewed in FIG. 18, of the rachet wheel when the pawl 198 moves upward.

Figure 19:
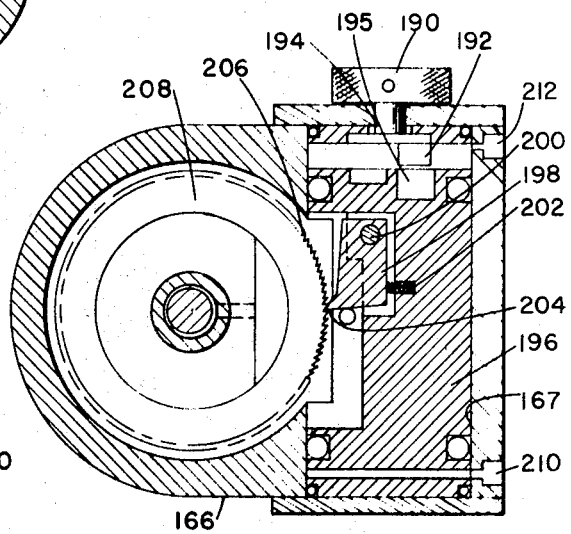
FIG. 19 is a view taken along line 19—19 of FIG. 14.

As may be seen in FIG. 19, a hand wheel 126 is fixedly attached to the lead screw 160. Hand wheel lock 137 is attached to a shaft 216 which fits within a recess 217 in the end of the lead screw and engages the sides thereof. Clockwise rotation of the locking handle 137 causes the shaft 216 to move forward within the recess 217, the fore-end 218 of which is tapered to engage the pin 220, pushing it outward against the stop block 222 in turn pushing the stop block against the rachet wheel 208. This serves to firmly lock the rachet wheel 208 in the race 214 which is fixedly attached to the lead screw 160. Therefore, when the hand wheel lock 137 is turned fully clockwise, the lead screws 116 and wheel 126 thereon are locked to the rachet wheel 208 and rotation of the rachet wheel by reciprocal movement of the piston 196 causes like rotation of the lead screw and hand wheel. This is the operating position of the lead screw. Alternatively, when the hand wheel lock 137 is turned counterclockwise, the shaft 216 is backed away from the pin 220 disengaging the stop block 222 from the rachet wheel 208. The rachet wheel 208 is then free to rotate in the race 214 without causing rotation of the lead screw 160. With the hand wheel lock in the latter position, the hand wheel can then be freely turned, turning the lead screw to position the carriage, either tool holder or dresser, at the desired position in relation to the grinding wheel 56.

FIG. 20 is a side view of the grinding wheel dresser 22 mounted on the dresser carriage 24. As shown, the dresser is positioned adjacent to the edge of the grinding wheel 56. The dresser comprises a lower diamond 232 for dressing the undersurface 58 of the grinding wheel 56 and an upper diamond 234 for dressing the grinding face 60 of the grinding wheel 56. As shown in FIGS. 20 through 23, the lower diamond 232 is mounted at the outer end of an arm 236 which is pivotally connected by hinge means 238 to an upper frame member 240. A cylinder 242 having a piston (not shown) therein and including a piston rod 244 is attached at the end opposite the diamond to a flange 246 on the dresser frame. The attachment is by means of a ball and socket 248 so that the cylinder 242 is allowed a certain amount of pivotal movement. The piston rod 244 is attached to the arm 236 at a point ajacent to the diamond 232, also by means of a ball and a socket 250. The upper diamond 234 is carried by a second arm 252 that is hingedly attached to the upper frame 240 by hinge means 254. A second arm 256 is fixedly attached to the arm 252 with the outer end 258 of the arm 256 connecting with a piston rod 260 by means of a ball and socket 262. The piston rod 260 mounts a piston (not shown) within a upper arm operating cylinder 263, the lower end of which is fixedly attached to the upper frame 240. It will be noted that pivotal movement of arm 236 respective to operation of cylinder 242 to extend the lower diamond 232 will operate a control valve 261 of the pneumatic system as shown in FIG. 29A. Similarly, pivotal movement of arm 252 to extend the upper diamond 234 will operate a control valve 265 as shown in FIG. 29A.

A frame 275 is carried by and pivotally attached to an upstanding flange 264 mounted on the dresser frame 230. A pin 270 connects the frame and flange for pivotal movement of the frame. Flange 264 includes an elongated arcuate slot 274 through which is passed a bolt 272 mounting a washer 273. Bolt 272 threadably engages a similarly threaded recess in the frame 275 for locking the frame at various positions along the slot 274. The upper arm and the diamond carried thereon mounted on the frame 275 are thus caused to change their angle of incidence to the grinding wheel by pivoting the frame about the pin 270.

The axis of pin 270 intersects the corner 62 of the grinding wheel.

The electrical portion of the control circuit is illustrated schematically in FIG. 28 of the drawings. Power for the apparatus is suitably derived from a source of three-phase alternating current supply voltage through switch 28. Power is supplied from the switch 28 through a group of fuses F–1 to a motor 302 which drives the spindle and a motor 304 which operates a pump for circulating the cooling fluid. The motor 302 has associated therewith a starter solenoid 306 and motor 304 has associated therewith a starter solenoid 308.

There is also provided a transformer 310. Its primary winding is connected across one phase of the three-phase system and its secondary winding is connected through fuse F–2 to contact 312 of solenoid 308, the other side of contact 312 being connected to line 314. The secondary winding of transformer 310 is also connected through normally closed stop switch 11 and normally open start switch 7 to the coil of the starter solenoid 306. The juncture between switches 7 and 11 is connected through contact 320 to the coil of solenoid 306. Three contacts 322 are also associated with the starter solenoid 306, the contacts 322 being connected between motor 302 and the source of power.

When switch 28 is closed, power will be applied to the primary winding of transformer 310 and to one side of each of the contacts 322. When switch 7 is closed, the coil of the starter solenoid 306 will be energized causing each of the contacts 312, 320, and 322 to close. The motor 302 will be energized upon closure of contacts 322 and caused to run. Closure of contact 312 will apply power from transformer 310 to line 314. Contact 320 provides a holding function and supplies power to maintain the coil of solenoid 306 energized after the switch 7 returns to its normally open condition. It will be noted that if switch 11 is momentarily opened, the coil of solenoid 306 will become de-energized and each of contacts 312, 320 and 322 will open causing the coil of solenoid 306 to become de-energized and removing power from the motor 302. It also will be noted that the lamp 2 is connected between line 314 and ground such that when contact 312 is closed, lamp 2 will be energized, indicating that motor 302 is running.

Line 314 is connected to the coil of solenoid 308 through contact 326 of switch 13 and through a second path comprising contact 328 of switch 13 and contact 330 of solenoid 308. Solenoid 308 includes a group of three contacts 332, each of the contacts 332 being connected between the motor 304 and the three phase supply voltage. Switch 13 is, in the specific example shown, a rotary switch spring located to a center position in which contact 326 is open and contact 328 closed. When turned to the right (the start position), both contacts are closed; when turned to the left (the stop position) both contacts are open. Thus, when switch 13 is operated to the start position, power will be applied through contact 326 to energize the coil of the starter solenoid 308. When the coil is energized, contacts 330 and 332 will be closed, causing power to be applied to the motor 304 which drives the coolant pump. When the switch 13 is released, contacts 326 and 328 will be in the position shown and the coil of solenoid 308 will be energized through contact 328 and contact 330.

Circuitry of FIG. 28 also includes a latching relay 340 having a coil 341A for placing the contacts of the relay in the latched position and a contact 341B for unlatching the contacts of the relay. Contact 341A is connected to line 314 through the manual dress switch 9 and connect 352 of a second relay 342. It will be noted that contact 352 is closed when relay 342 is not energized and that coil 341A can only be energized through contact 352. Coil 341A is also connected to line 314 through a second path comprising contact 352 and a contact 384 operated by the dresser counter 40. Relay 340 has associated therewith four contacts, 344, 346, 348 and 350. Contacts 344, 338, and 350 are open when relay 340 is unlatched while contact 346 is closed. Contacts 346 and 350 are of a time delay type. In accordance with the specific example described herein, contacts 346 and 350 are pneumatically controlled, such that contact 346 will open a predetermined time interval after coil 341A is energized and contact 350 will close the same time interval after coil 341A is energized. Power is applied to energize solenoid 364 through contacts 344 and 346 of relay 340. Power is applied from line 314 to energize solenoid 366 through contact 348 of relay 340, and power is applied to energize solenoids 362 and 363 through contacts 348 and 350 of relay 340. Solenoid 364 is associated with a control valve for controlling the operation thereof. Solenoids 362 and 366 are also associated with control valves. Solenoid 363 is associated with the dresser counter 40 and is effective when energized to reset the dresser counter to a count of zero.

Coil 341B of relay 340 is connected to line 314 through switch 359. Switch 359 is operated to the closed position when both of the dressing diamonds are fully extended. Closure of switch 359, therefore, energized the unlatching coil 341B opening each of contacts 344 and 348 and permitting contact 350 to return to its normally open position and permitting contact 346 to return to its normally closed position. Thus, when coil 341B is energized, each of the solenoids 362, 363, 364 and 366 are de-energized.

The coil of relay 342 is connected to line 314 through a limit switch 361. Limit switch 361 is positioned to be closed when the dresser carriage 24 has moved toward the grinding wheel a distance that would indicate the grinding wheel is exhausted. Thus, when the grinding wheel is exhausted, switch 361 will close energizing relay 342. When relay 342 is energized, its contacts 356 and 354 will close and contact 352 will open. As mentioned before, when contact 352 is open it is not possible for the coil 341A to be energized. Closure of contact 354 will apply power to energize the red lamp 4 indicating that the grinding wheel is exhausted. Closure of contact 356 will energize solenoid 366.

Normally closed contacts 372 and normally open contacts 384 are both associated with the dresser counter. These two contacts will be in their normal position when the count of the dresser counter is less than that set by knob 42. When the count of the dresser counter attains the count set by knob 42, contact 384 will close and contact 372 will open. Closure of contact 384 when contact 352 is closed will be effective to energize coil 341A of relay 340.

Switches 370, 377 and 378, along with coils 374, 375, 376, 380 and 382 are associated with the counters and their operation can best be understood with reference to FIGS. 24–27 of the drawing. Switch 370 is associated with work station 17A and is momentarily closed each time the associated foot pedal is operated. Similarly, switch 378 is associated with work stations 17B and is closed each time the associated foot pedal is operated. Closure of switches 370 and 378 will cause energization of solenoids 375 and 380 respectively. When solenoid 375 is energized, its shaft will engage rachet gear 386 causing shaft 388 to turn 36°. Cam 390 is connected to shaft 388 and each 72° rotation of shaft 388 will cause cam 390 to close switch 392 once. Thus, two closures of switch 370 will result in one closure of switch 392. When switch 392 is closed, solenoid 374 is energized to operate counter 36A. Similarly, each two operations of switch 378 will cause shaft 394 to rotate 72° causing cam 396 to operate switch 398 energizing solenoid 399 which operates counter 36B.

Cams 390 and 396 are each suitably as shown in FIG. 27 of the drawings and, as such, include 5 flat portions 397 connected by rounded transition regions 395. When the switch operator 393 associated with one of the switches 392 and 398 is in the center of a flat portion, the associated switch will be open. When the operator is positioned on one of the transition regions, the switch will be closed.

The rachet wheels 386 are suitably as shown in FIG. 25 of the drawing and include ten teeth 391 adapted to engage the shaft 389 of one of the solenoids 375 and 380. Operation of one of the solenoids will, therefore, cause the associated shaft to rotate 36°.

Cam 387 is suitably as shown in FIG. 26 of the drawing and includes ten raised portions 385. When the operator 383 associated with switch 377 is on a raised portion, the switch will be closed. When the operator is between two raised portions, the switch will be open. Cam 387 is mounted for rotation on shafts 388 and 394 and includes a bevel gear 381 mounted for rotation on shaft 379 and positioned in a slot 373 formed in cam 387. Bevel gears 371 and 369 are mounted on shafts 388 and 394 respectively and each engage gear 381. Accordingly, if shaft 388 turns 36°, cam 387 will turn 18°. Similarly, if shaft 394 turns 36°, cam 387 will rotate 18°. Thus, two operations of switches 370 and 378, either singularly or in combination, will result in 36° rotation of cam 387 and one operation of switch 377. Closure of switch 377 will result in solenoid 376 being energized to advance the count in counter 40 by one.

It will be noted that switches 370 and 378 are operated responsive to operation of foot pedals 44. Since the foot pedal is operated twice in the cause of splitting one drill, the count stored in counters 36A and 36B will be the number of drills split by each work station. Further, the count stored in counter 40 will accurately reflected the total number as simultaneous operation of the foot pedals will cause the cam 387 to rotate 36°, operating switch 377 once.

In the above description of the electrical control circuitry, no attempt has been made to correlate the operation of the control circuitry with the operation of the machine in view of the substantial interdependence during the pneumatic control circuitry and the electrical control circuitry. Rather, the circuit connections and operations necessary to energize certain solenoids and relays have been described.

The pneumatic control system is shown in FIGS. 29A and 29B of the drawings. It can be seen to comprise an air supply 400 which is filled by compressor 402 driven by motor 404. The outlet of the tank 400 is connected through filter 406, pressure regulating valve 408 and an oiler 409 to the remainder of the pneumatic control system.

The control system further includes two valves 410 and 412 which are operated by solenoids 362 and 364 respectively as mentioned previously with reference to the electrical schematic. Thus, the oiler 409 is connected by line 413 to port 414 of valve 410 and by line 415 to port 416 of valve 412. The valve 412 includes a port 418 which is open to atmospheric pressure, a port 420 which is connected by line 422 to port 212 positioned at one end of each of the cylinders 167. Similarly, port 430 of valve 412 is connected through line 432 to port 210 at the opposite end of each of the cylinders 167. As described previously with reference to FIG. 19 of the drawings, movement of the piston 196 in the cylinder 167 in the direction indicated by the arrow is effective to advance the associating carriage the desired amount, suitably 0.001 inch. Valve 412 also includes a spool 432 which is biased to the position shown, suitably by a spring arrangement 433. However, when the solenoid 364 is energized, the spool 432 will be moved in the direction of the solenoid. Thus, when the solenoid is de-energized, port 416 will be connected to port 430 and port 420 will be connected to port 418. When solenoid 364 is energized, port 416 will be connected to port 420 and port 430 will be connected to port 418.

The control valve 410 is quite similar in structure to that of control valve 412. As such, in addition to port 414 it includes ports 438, 440 and 442. It also includes a spool 444 which is bias to the position shown by means illustrated schematically as spring 445. Thus, when solenoid 362 is not energized, port 414 will be connected to port 438 and port 440 will be connected to port 442 which is connected to atmospheric pressure. On the other hand, when solenoid 362 is energized, port 414 will be connected to port 440 and port 438 will be connected to port 442. Port 438 is connected by line 446 to a reservoir 448 containing hydraulic fluid 450. Reservoir 448 is connected through a throttle valve 452 and a check valve 454 to port 456 of cylinder 263 which is operative to extend one of the dressing diamonds from movement of piston 458 in the direction shown. Similarly, reservoir 448 is connected to throttle valve 460 and check valve 462 to port 464 of cylinder 242 in which piston 466 moves. Movement of the piston 466 in the direction indicated by the arrow will be effective to extend the other diamond dressing the grinding wheel. Shaft 244 associated with cylinder 242 is connected to a control valve 261. The control valve 261 is, preferably, a rotary type valve but illustrated schematically as shown. The control valve 261 includes a pair of ports 470 and 472. Port 472 is vented to atmosphere while port 470 is connected through throttle valve 474 to port 440 of control valve 410. Port 470 is also connected to port 476 of a pressure operated switch 359.

Similarly, valve 263 includes a port 478 which is vented to atmospheric pressure and a port 480 which is connected to port 476. Switch 359 will be open when either port 470 is connected to port 472 or port 480 is connected to port 478. However, during the dressing cycle when neither port 470 or port 480 is connected to atmosphere, pressure will be developed in cylinder 482 associated with switch 359 to close switch 359.

Port 440 of control valve 410 is connected by line 484 to cylinder 182 which has a piston 180 operatively associated therewith. Line 484 is also connected to a reservoir 486 having hydraulic fluid 450 therein. The reservoir 486 is connected through throttle valve 488 and check valve 490 to ports 492 and 494 of cylinders 242 and 263 respectively. Accordingly, when the spool 444 of control valve 410 is positioned as shown, pistons 458 and 466 of cylinders 263 and 242 respectively will be actuated to retract the diamonds, each of ports 470 and 480 of the control valves 261 and 265, respectively, will be vented to atmospheric pressure and switch 359 will be opened. When solenoid 362 is energized, port 414 will be connected to port 440 applying hydraulic fluid to ports 492 and 494 of cylinders 242 and 263 respectively to advance the diamonds. At such time as both diamonds are completely extended, neither of ports 470 and 480 will be connected to atmospheric pressure and piston within cylinder 482 will move closing switch 359.

Oiler 409 is also connected by line 500 to line 502 which connects to port station 17A and by line 504 which connects to port station 17B. Line 500 is also connected to port 506 of control valve 508 associated with solenoid 366. Control valve 508 includes port 510 which is vented to atmospheric pressure and a port 512 which is connected to port 514 of valve 516. Control valve 508 includes spool assembly 518 having passageways therein such that when solenoid 366 is not energized port 512 will be connected to port 510 and port 506 will be closed. When solenoid 366 is energized, the spool 518 will move closing port 510 and connecting port 506 to port 512. The valve 516 includes a spool 520 which is positioned as shown by means illustrated schematically as spring 522. Thus, when the spool 520 is positioned as shown, port 524 of valve 516 will be connected to port 526 and, similarly, port 528 will be connected thereto. When the spool 520 is moved to the right, as a result of pressure applied through port 514, each of the ports 524, 526, 528 and 530 will be blocked. Port 524 is connected by a line 532 to work station 17A and port 530 is connected by a line 534 to work station 17B. Port 528 is connected by line 536 to the foot pedal 44 associated with work station 17B and port 526 is connected by line 538 to the foot pedal 44 associated with work station 17A.

Each of the foot pedals 44 are identical and, accordingly, only one is shown in schematic detail. It can be seen to include ports 540 and 542 with line 538 being connected to port 540 and 542 being vented to atmosphere. When the foot pedal is not operated, communication will not be provided between ports 540 and 542. However, operation of the foot pedal will operate the valve to provide communication between ports 540 and 542. Pressure switches 370 and 378 are associated with work stations 17A and 17B respectively. Switches 370 and 378 are suitably similar to switch 359. However, they are normally open and close responsive to decrease of pressure in lines 532 and 534 respectively.

As described previously with respect to FIGS. 14, 16 and 17, each of the carriage assemblies has associated with it a cylinder 170 in which a piston 174 moves to operate shaft 172. Movement of the piston 174 within cylinder 170 is effective to continuously apply pressure against the lead screw and prevent any undesired lateral movement. Line 500 is connected to ports 544 of each of the cylinders 170 as shown. It will be noted that pneumatic pressure is continuously applied to line 500 and, accordingly, continuous pressure will be exerted against the pistons 174.

The work stations 17A and 17B are identical and only 17A is shown in detail. Thus, each work station includes a control valve 550 having a spool 552 positioned therein. Valve 550 includes ports 553, 554, 556, 558, 560, 562, 564, and 566. Prior to actuation of the foot pedal 44, the spool 552 will be positioned as shown and, accordingly, port 560 will be vented to atmosphere through port 566 and port 554 will be connected to port 562 as shown. Port 554 is connected directly to line 502 while ports 553 and 556 are connected to line 502 through throttle valves 568 and 570 respectively. Port 560 is connected through throttle valve 572 and a check valve 574 to port 105 of cylinder 106. Similarly, port 562 is connected through check valve 576 and throttle valve 578 to port 103 of cylinder 106. Accordingly, with the plug 552 positioned as shown, piston 108 will move to the rightmost position of cylinder 106 and actuating arm 104 will be positioned such that the drill will not engage the grinding wheel. On the other hand, if the plug 552 is moved towards the left, port 560 will be connected to port 554 and port 566 will be connected to port 562 moving piston 108 in the direction indicated by the arrow operating the arm 104 to position a drill being split against the grinding wheel.

Each of the work stations also includes a valve 580 having ports 582, 584, 586, and 588. Valve 580 includes a spool assembly 590 which is normally positioned as shown by means illustrated schematically as a spring 592. Plug 590 includes passageways such that in the normal position ports 584 and 586 will be blocked but when the plug 590 moves in the direction indicated by the arrow, port 584 will be connected to port 586. Port 564 of valve 550 is connected to ports 586 and 588 of valve 580. Further, port 103 of cylinder 106 is connected through throttle valve 594 and check valve 596 to port 582 of valve 580.

A third control valve associated with each work station is designated generally by the reference character 600. It includes ports 602, 604, 606, 608 and 610. Port 602 is connected to line 532 and through a throttle valve 612 to line 502. Port 558 of valve 550 is connected to ports 606 and 608. Port 604 is connected to a reservoir 614 while port 610 is vented to atmospheric pressure. Plug member 616 associated with valve 600 includes passageways for connecting port 604 to port 610 and blocking port 606 when the plug is in a normal position. When the plug is moved in the direction indicated by the arrow, port 606 will be connected to port 604 and port 610 will be plugged.

Having now described the mechanical structure as well as the electrical and pneumatic controls, operation of the machine will be described.

The work stations are first adjusted to provide the desired angles on the drills at such time as they are ground and the positions of the work stations and the dresser stations relative to the grinding wheel are established. The master on-off switch 28 is closed applying power to the system. When start switch 7 which is spring loaded to the open position is momentarily closed, current will flow to energize relay 306 causing its contacts 320, 312 and 322 to close. When switch 318 opens, relay 306 will be maintained energized through holding contact 320. Power is also applied through contact 312 and relay 306 to line 314. Lamp 2 will be energized providing a green indication and indicating that power has been applied to motor 302 causing the grinding wheel 56 to rotate in the direction shown in FIG. 2 of the drawings. Switch 13 is then operated to energize relay 308 and cause its contacts 330 and 332 to be closed. Switch 13 is a rotary switch spring loaded to the center position. In the center position, contact 326 is open and contact 328 closed. When turned to the right, both contacts are closed and when turned to the left, both contacts are open. Thus, when switch 13 is released, contact 328 will be closed providing holding contact for relay 308 through contact 330 of relay 308, maintaining 308 energized until switch 326 is operated to stop position. Power will be applied through contacts 332 of relay 308 to supply power to the motor 31 which operates the pump supplying coolant fluid to the system.

The manual dresser switch 9 is then operated energizing coil 341A of relay 340 and causing contacts 344 and 348 of relay 339 to close. Contact 346 is closed and contact 350 is open. It will be noted, however, that contacts 346 and 350 are of the time delay type and after a predetermined period of time, suitably one second, contact 346 will open and contact 350 will close due to operation of a pneumatic actuator and a spring loaded bellows. Upon closure of contacts 344 and 348, solenoids 364 and 366 will be energized operating valves 412 and 508. The spool within valve 508 will move in the direction of the arrow, connecting port 506 to port 512 and blocking port 510. Air will flow into port 514 of valve 516 causing plug 520 to move in the direction of the arrow to block ports 524, 526, 528 and 530. Accordingly, operation of the foot control 44 will have no effect.

Operation of solenoid 364 will cause operation of the valve 412. Thus, as shown in FIG. 29A, when solenoid 364 is energized, the control valve 412 will be moved in the direction shown by the arrow and pneumatic pressure will be applied to line 422 to cause cylinders 167 to operate with the pistons 196 moving as indicated. As described previously, the amount of travel by the pistons is determined by the setting of the dial on top of the control. At the end of the one second delay, solenoid 364 will become de-energized due to opening of contact 346 and the pistons 196 will return to the normal position. Also, after the one second delay, contact 350 will close causing solenoids 362 and 363 to be energized. When solenoids 362 and 363 are energized, the dresser counter 40 will be reset and the piston in control valve 410 will move as indicated by the arrow. Pneumatic pressure will be applied through line 413, ports 414, 440 and line 484 to reservoir 486. Pressure on the reservoir 486 will cause hydraulic pressure to be applied through valve 490 to cause operation of pistons 458 and 466 which advance the diamonds. Simultaneously, pneumatic pressure will be applied to cylinder 182 to cause the dresser station to advance fortythousandths of an inch moving the dresser station to the dress position. It will be noted that dresser station is advanced and the diamonds extended at the same time. However, the station moves much quicker than the diamonds due to the action of the throttle valves 452 and 460 which restrict the rate of fluid flow and the conversion from pneumatic to hydraulic fluid.

The diamonds are extended until the pistons 458 and 466 are moved the direction indicated a sufficient amount that there will no longer be passage to atmospheric pressure through control valves 261 or 263 and the flow of air through throttle valve 474 will cause operation of pneumatically operated switch 359. When switch 359 closes due to operation of cylinder 482, coil 341B of relay 340 will be energized unlatching relay 340 to open contacts 344 and 348 and permit contact 346 to close and contact 350 to open. Each of solenoids 362, 363 and 366 will no longer be energized. When solenoid 362 is de-energized, the piston therein will move to the right connecting line 413 to reservoir 448 through ports 414 and 438. On this occurance, hydraulic pressure will be applied through valves 454 and 462 to operate pistons 458 and 466 returning the diamonds to their original position. The control valves 261 and 263 open to atmosphere permitting the pressure switch 359 to open. At this time, the grinding wheel will be dressed and in readiness to accept a drill. When the foot pedal associated with one of the stations is operated, the drill will be split.

It will be noted that there are provided three distinct cylinder assemblies 170 which continuously receive pressure through line 500. Two of the cylinders maintain pressure against the feed screw at the work stations to prevent blacklash. The remaining cylinders 170 associated with the dresser station is effective when pressure is relieved from the dresser station also to return the dresser station to its non-dressing position.

When the foot pedal 44 is operated, the spool 525 within cylinder 527 will be moved into the direction shown such that port 540 will be connected to port 542. When solenoid 366 is not energized, the plug 520 of valve 516 will be positioned as shown and, accordingly, port 526 of valve 516 will be connected to atmospheric pressure through foot pedal 44 with throttle 612 restricting air flow from line 502. The flow of air into port 524 from port 602 of valve 600 will cause the spool 616 within valve 600 to move in the direction shown connecting port 606 to port 604 and causing a momentary decrease in pressure in the end 557 of valve 550 as air flows into the reservoir. Accordingly, the spool of valve 550 will move in the direction shown connecting port 554 to port 560. Air will flow into port 105 causing the piston 108 to move in the direction indicated by the arrow. Movement of the piston 108 will, as described previously with reference to FIGS. 5 through 9, cause the tool holder to pivot about axis 102 moving the drill to be split into contact with the grinding wheel.

When pneumatic pressure is applied to cause the cylinder 108 to move, it maintains pressure applied through throttle valve 594 into port 582 of control valve 580, causing the spool 590 positioned therein to retain its position until piston 108 stops moving. When piston 108 ceases to move, pressure will drop at port 582 at a rate controlled by throttle valves 578 and 594. The spool 590 will move in the direction indicated by the arrow when the pressure drops sufficiently. When the plug 590 has moved sufficiently that port 586 is connected to port 584, the pressure at port 564 of valve 550 will be less than the pressure at point 558. Upon this occurance, the spool of valve 550 will move in the direction opposite that shown by the arrow to the original position, as shown in the drawing. Port 554 will be connected to port 560 and the piston 108 will be caused to move in the opposite direction retracting the drill from its position against the grinding wheel.

It will be noted that the valve 594 controls the dwell time of the work station. Thus, once the spool of valve 550 moves in the direction of the arrow as described above it must remain in that position until control valve 580 is operated. The time required to operate valve 580 is a function of the rate at which air flows past the valve 594 to cause movement of the plug 590. It will also be noted that check valves 574, 576 and 596 are positioned such that air can flow freely into ports 105, 103 and 582 through an associated check valve, but flows from such ports at a controlled rate through the throttle valves.

A pressure switch 370 similar in character to pressure switch 454 is associated with the work station 17A and pressure switch 378 is associated with station 17B. Each time one of the foot pedals 44 is operated, the associated pressure switch will be operated to close its associated contact.

As described previously, with reference to FIG. 28 of the drawings, operation of the switches 370 and 378 is effective to operate the counters 36A and 36B associated with the work stations as well as the dresser counter 40. Thus, each time switch 370 is operated twice, the count in counter 36A will advance one and each time switch 378 is operated twice, the count in counter 36B will advance one. Two operations of switches 370 and 378, either singularly or in combination, will cause the count in counter 40 to advance one.

When the foot pedal is released, the spool 525 will move to a position blocking communication between ports 540 and 542. The flow of air through throttle valve 612 will be applied through port 602 of valve 600 to restore the plug 616 to the position shown in FIG. 29B. With valve 600 in this condition, port 606 will be blocked and as air can no longer flow from port 558, the flow of air through throttle valve 570 into port 556 will cause the plug 552 of control valve 550 to return to position shown at such time as the plug 590 of control valve 580 is moved to a position in which its port 586 is connected to port 584. It will be noted that pressure will rebuild in chamber 557 when the reservoir 614 is full as the result of flow of air through throttle valve 570.

Operation of the machine will continue as described above responsive to the operation of the foot pedal 44 until either the grinding wheel is exhausted or the count stored in the dresser counter 40 attains the count set by the knob 42. Thus, when the count stored in the dresser counter attains the set count, contact 372 will open and contact 384 will close. When contact 372 is open, additional electrical signals will not be provided for operating any of the counters associated with the apparatus. Further, upon closure of contact 384, coil 341A of relay 340 will be energized to cause the grinding wheel 56 to be dressed. The dressing cycle will be the same as that produced upon operation of the manual dressing switch 9 and, accordingly, will not be described again. The energization of solenoid 363 responsive to operation of the relay 340 will be effective to reset the dresser counter 40 to zero. Resetting of the dresser counter 40 will cause switch 384 to open and switch 372 to close. When coil 341B is energized upon completion of the dressing operation, the relay 340 will be reset and the apparatus will be in readiness for operation. It will be noted that during the time interval after relay coil 341A is energized and before coil 341B is energized, solenoid 366 will also be energized preventing operation of either the foot pedals 44 having any effect upon the machine.

When the grinding wheel is consumed, the dresser station will have moved sufficiently close to the grinding wheel to close switch 361. Relay 342 will be energized responsive to closure of switch 361 resulting in its contacts 356 and 354 being closed and normally closed contact 352 being operated to the open position. As contact 354 closes, it will apply power to energize lamp 4 which indicates that the grinding wheel is consumed. Closure of contact 356 will be effective to energize solenoid 366. As described previously, when solenoid 366 is energized, it will operate valve 508 to render operation of the foot pedals 44 ineffective. Further, with contact 352 open, power cannot be applied to energize relay coil 341A and the grinding wheel cannot be dressed so long as the dresser station is in position to maintain the switch 361 closed. Also, when contact 352 is opened, power cannot be applied to energize the various solenoids associated with the counters 36A and 36B and 40. Thus, operation of the machine will be prevented until the dresser station is moved away from the grinding wheel in the course of replacing the grinding wheel. After a new grinding wheel has been installed, it will, of course, be necessary to again position the work stations relative to the grinding wheel.

Although the present invention has been described with reference to a particular preferred embodiment thereof, many changes and modifications thereto will become apparent to those skilled in the art in view of the foregoing description which is intended to be illustrative and not limiting of the invention defined in the appended claims.

What is claimed is:

1. Drill splitting apparatus for grinding a split on the point of a drill comprising:
   (a) a frame,
   (b) a rotary grinding wheel supported on said frame and having a grinding surface inclined at an angle $\beta$ to a vertical plane and terminating in a grinding edge,
   (c) at least one work station supported on said frame, said work station including a holder for a pre-pointed drill to be split,
   (d) said holder including a drill bushing means for positioning a drill in said holder,
   (e) means for moving said holder to a grinding position to engage a trailing lip to the tip of said drill held by said holder against said grinding surface with the drill axis inclined at a predetermined angle to said grinding surface,
   (f) said work station further including means for supporting said holder for pivotable movement about a first axis, means for supporting said holder for pivotable movement about a second axis normal to said first axis, and means supporting said drill bushing for axial rotation about a third axis, and
   (g) said first, second and third axes intersecting a common point when said drill is positioned in the grinding position whereby adjustment of said holder along one axis will not substantially effect adjustment along another of said axes.

2. Drill splitting apparatus as defined in claim 1 wherein said holder is supported on said work station for pivotal movement about a fourth axis between a loading and unloading position away from said grinding wheel and a grinding position adjacent said grinding wheel and further including hydraulic means for selectively producing said movement and controlling the dwell time of said holder in said grind position.

3. Drill splitting apparatus as defined in claim 1 wherein said drill bushing means includes a drill bushing, a pin for projecting into a bore of said drill bushing for engaging a flute of said drill and wherein said holder includes a stop for engaging said drill to limit axial movement of said drill through said drill bushing, said first, second and third axes intersecting at a point on said stop which engages said drill.

4. A drill splitting apparatus as defined in claim 2 wherein said hydraulic means include a first control valve effective in one position for causing pivotal movement of said holder to said loading and unloading position and effective in a second position to cause pivotal movement of said holder to said grinding position, means normally positioning said first control valve in said first position, means responsive to actuation of an actuator associated with the work station for positioning said first control valve in said second position and second control valve means responsive to movement of said holder for returning said first valve means to the first position.

5. Apparatus as defined in claim 3 further including a passageway formed in said holder for directing coolant fluid on to said drill and grinding wheel and means for pumping coolant fluid through said passageway, said passageway extending through said drill bushing means at a point near said stop.

6. Drill splitting apparatus as defined in claim 1 wherein said grinding wheel includes an undersurface inclined at the angle $\alpha$ to a horizontal plane and intersecting said grinding surface at said grinding edge and wherein said work station includes means for supporting said holder for pivotal movement about a fourth axis between a loading and unloading position away from said grinding wheel and a grinding position adjacent to said grinding wheel and means for selectively producing said movement and controlling the dwell time of said holder in said grinding position, said fourth axis being normal to the plane of the underside of said grinding wheel.

7. Drill splitting apparatus as defined in claim 6 further including means for varying the spacial relationship between the plane in which said holder pivots about said fourth axis and the plane of the underside of said grinding wheel.

8. Drill splitting apparatus as defined in claim 3 wherein said stop engages the tip of said drill adjacent the point thereof wherein said holder further includes a base, a head pivotally mounted on said base for movement about said first axis, a bushing holder connected to said head for pivotal movement about said second axis, said bushing holder including a base for coaxially supporting said drill bushing for rotation about the third axis, said stop being supported by said bushing holder.

9. Drill splitting apparatus as defined in claim 8 wherein a portion of the walls of said drill bushing and said bushing holder is cut away to permit the drill positioned in drill bushing to engage the grinding wheel while supporting the drill along its length to minimize flexing thereof as the drill engages the grinding wheel.

10. Drill splitting apparatus as defined in claim 8 further including a passageway extending through said head and said bushing holder and communicating with the bore of said drill bushing at a point near said stop for directing coolant fluid into the interface between the grinding wheel and a drill in the grinding position.

11. Drill splitting apparatus as defined in claim 6 further including a dressing means for dressing said grinding wheel and means for actuating said dressing means to dress said wheel responsive to operation of said work stations a predetermined number of times.

12. Drill splitting apparatus as defined in claim 11 wherein said dressing means includes a dressing station with dressing elements for dressing said grinding surface and said under surface, mean responsive to actuation of said dressing means for advancing said dressing station a predetermined amount towards the dressing wheel, means for extending said dressing elements to cause them to move across said grinding surface and under surface to dress same, and control means for preventing operation of said work station while said dresser means is operative.

13. Drill splitting apparatus as defined in claim 12 further including means responsive to actuation of said dressing means for advancing said dresser station and said work station equal distance radially towards said grinding wheel to maintain the same spacial reltionship between the grinding surface and the work and dresser stations before and after dressing of the grinding wheel.

14. Drill splitting apparatus as defined in claim 12 wherein said means for extending said dressing elements is a hydraulic means including control means responsive to all of said dressing elements being fully extended for operating said hydraulic means to return said dressing elements to an initial position and operating said control means to permit operaiton of said work stations.

15. Drill splitting apparatus as defined in claim 11 wherein said means for actuating includes counter means for storing a count equal to the number of times said work stations are operated, means responsive to the count in said counter means attaining a settable level for generating a control signal to actuate said dressing means and reset said counter means to zero count.

References Cited
UNITED STATES PATENTS

| | | | |
|---|---|---|---|
| 1,993,418 | 3/1935 | Smyser | 51—219X |
| 2,199,773 | 5/1940 | Armand | 51—219 |
| 2,870,579 | 1/1959 | Siemsen et al. | 51—219X |
| 3,040,480 | 6/1962 | Winslow et al. | 51—219X |
| 3,357,138 | 12/1967 | Young | 51—219X |

LESTER M. SWINGLE, Primary Examiner

U.S. Cl. X.R.

51—219